United States Patent
Wang et al.

(10) Patent No.: US 10,764,360 B2
(45) Date of Patent: Sep. 1, 2020

(54) MANAGING PERSISTENT TCP CONNECTIONS IN AN IPVS ENVIRONMENT

(71) Applicants: Kai-Ting Amy Wang, Toronto (CA); Man Pok Ho, Richmond Hill (CA)

(72) Inventors: Kai-Ting Amy Wang, Toronto (CA); Man Pok Ho, Richmond Hill (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 651 days.

(21) Appl. No.: 15/446,836

(22) Filed: Mar. 1, 2017

(65) Prior Publication Data
US 2018/0255127 A1 Sep. 6, 2018

(51) Int. Cl.
*H04L 29/08* (2006.01)
(52) U.S. Cl.
CPC .......... *H04L 67/1004* (2013.01); *H04L 67/14* (2013.01)
(58) Field of Classification Search
CPC ............................ H04L 67/1004; H04L 67/14
See application file for complete search history.

(56) References Cited

U.S. PATENT DOCUMENTS

| | | | | |
|---|---|---|---|---|
| 2004/0268357 A1* | 12/2004 | Joy | ......................... | H04L 29/06 718/105 |
| 2005/0055435 A1* | 3/2005 | Gbadegesin | ............ | H04L 29/06 709/224 |
| 2008/0162754 A1* | 7/2008 | Ogawa | .................. | G06F 3/0613 710/74 |
| 2009/0157882 A1* | 6/2009 | Kashyap | ................. | H04L 69/16 709/227 |
| 2012/0311580 A1* | 12/2012 | Emelianov | ............ | G06F 16/119 718/100 |
| 2018/0020037 A1* | 1/2018 | Ali | .......................... | H04L 65/80 |

FOREIGN PATENT DOCUMENTS

| | | |
|---|---|---|
| CN | 101980490 A | 2/2011 |
| CN | 103200120 A | 7/2013 |

OTHER PUBLICATIONS http://www.linuxvirtualserver.org/VS-DRouting.html.
https://lwn.net/Articles/495304/.
https://www.suse.com/documentation/sle-ha-12/book_sleha/data/sec_ha_lb_lvs.html.

* cited by examiner

*Primary Examiner* — Michael A Keller
*Assistant Examiner* — Jsing Forng Lin (57) ABSTRACT

Methods and systems for managing a connection in an internet protocol virtual server (IPVS). At least a portion of checkpoint data is transmitted by a first node of the IPVS to a load balancer of the IPVS. The checkpoint data includes information for restoring an active connection of the first node and also information representing the current state of the active connection. The load balancer stores the checkpoint data in association with connection data for the connection. The first node terminates the connection. The load balancer updates the connection data with information about a second node of the IPVS. The checkpoint data is transmitted to the second node. Incoming data packets for the connection are then forwarded to the second node, in accordance with the updated connection data.

18 Claims, 5 Drawing Sheets

MANAGING PERSISTENT TCP CONNECTIONS IN AN IPVS ENVIRONMENT

FIELD

The present disclosure relates to persistent TCP connections in an IPVS environment. In particular, the present disclosure relates to load-balancing and management of such connections.

BACKGROUND

In a standard internet protocol virtual server (IPVS) environment, a virtual internet protocol (IP) address is shared by real request handling servers and an IPVS load balancer. All incoming IP packets arrive at the load balancer, which acts as a router to direct the IP packets to the appropriate server. The load balancer manages the connections to individual servers, to balance the load among the group of servers.

Connection oriented protocols, such as transmission control protocol (TCP), rely on the endpoints (also referred to as end nodes) of the connection to be active and connected for the duration of the connection. In TCP, there are certain mechanisms that may be used to ensure that the endpoints remain active during a connection.

In order to reduce the overhead of opening and closing TCP sockets, and to reduce the latency of performing TCP handshakes, persistent connections are often used. However, use of a persistent connection may result in resources (e.g., memory and other operating system resources) being locked to keep the persistent connection open even when there is no data being sent over the connection, making the resources unavailable for other clients. Further, a persistent connection presents difficulties for load rebalancing in a group of servers because the connection cannot be rerouted without breaking the persistent connection. If an active persistent connection is broken to allow for load rebalancing, data may be lost during this process and the client may be required to participate in another handshake process to re-establish the connection. This may be undesirable.

SUMMARY

The present disclosure describes example methods and systems that enable management of connections in an IPVS environment by providing a checkpointing and connection re-routing mechanism. By collecting and storing checkpoint data about an active connection, the connection can be moved from one server to another server within the servers of the IPVS, or the connection can be shut down and restarted, with little or no impact on the client experience.

In some aspects, the present disclosure describes a method for managing a connection in an IPVS. The method includes receiving a trigger to initiate checkpointing of an active connection at a node of the IPVS. The method also includes transmitting at least a portion of checkpoint data to a load balancer of the IPVS. The checkpoint data includes information for restoring the active connection and information representing a current state of the active connection. The method also includes terminating the active connection.

In other aspects, the present disclosure describes a node of an IPVS. The node includes a processing device configured to cause the node to receive a trigger to initiate checkpointing of an active connection of the node. The processing device is further configured to cause the node to transmit at least a portion of checkpoint data to a load balancer of the IPVS. The checkpoint data includes information for restoring the active connection and information representing a current state of the active connection. The processing device is further configured to cause the node to terminate the active connection.

In any of the preceding embodiments/aspects, a remaining portion of the checkpoint data may be transmitted to another database for storage.

In any of the preceding embodiments/aspects, the checkpoint data may include at least one of an encryption key, a sequence number, handshake information or TCP connection information.

In any of the preceding embodiments/aspects, the trigger may be an indicator that the node is to be taken offline, and the trigger may initiate checkpointing of all active connections at the node.

In any of the preceding embodiments/aspects, the trigger may include information identifying one or more active connections at the node to be checkpointed.

In any of the preceding embodiments/aspects, receiving the trigger may include generating the trigger.

In any of the preceding embodiments/aspects, terminating the active connection may be in response to receipt of a notification from the load balancer indicating that at least the portion of checkpoint data has been stored.

In other aspects, the present disclosure describes a method for managing a connection in an IPVS. The method includes receiving at least a portion of checkpoint data from a first node of the IPVS. The checkpoint data includes information for restoring a connection of the first node and information representing a current state of the connection. The method also includes transmitting at least the portion of checkpoint data to a second node of the IPVS. The method also includes forwarding an incoming data packet for the connection to the second node, in accordance with updated connection data.

In other aspects, the present disclosure describes a load balancer of an IPVS. The load balancer includes a processing device configured to cause the load balancer to receive at least a portion of checkpoint data from a first node of the IPVS. The checkpoint data includes information for restoring a connection of the first node and information representing a current state of the connection. The processing device is further configured to cause the load balancer to transmit at least the portion of checkpoint data to a second node of the IPVS. The processing device is further configured to cause the load balancer to forward an incoming data packet for the connection to the second node, in accordance with updated connection data.

In any of the preceding embodiments/aspects, prior to forwarding the incoming data packet, at least the portion of checkpoint data may be stored in association with connection data for the connection; and the connection data may be updated with information about the second node.

In any of the preceding embodiments/aspects, updating the connection data may be performed after receiving the incoming data packet for the connection.

In any of the preceding embodiments/aspects, updating the connection data may be performed prior to receiving the incoming data packet for the connection.

In any of the preceding embodiments/aspects, the connection data may be stored as a hash table.

In any of the preceding embodiments/aspects, receipt of the portion of checkpoint data at the second node may cause the second node to retrieve a remaining portion of checkpoint data from another database.

In any of the preceding embodiments/aspects, the method/apparatus may further include triggering checkpointing of the connection at the first node.

In any of the preceding embodiments/aspects, the method/apparatus may further include transmitting a notification to the first node indicating that at least the portion of checkpoint data has been stored.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
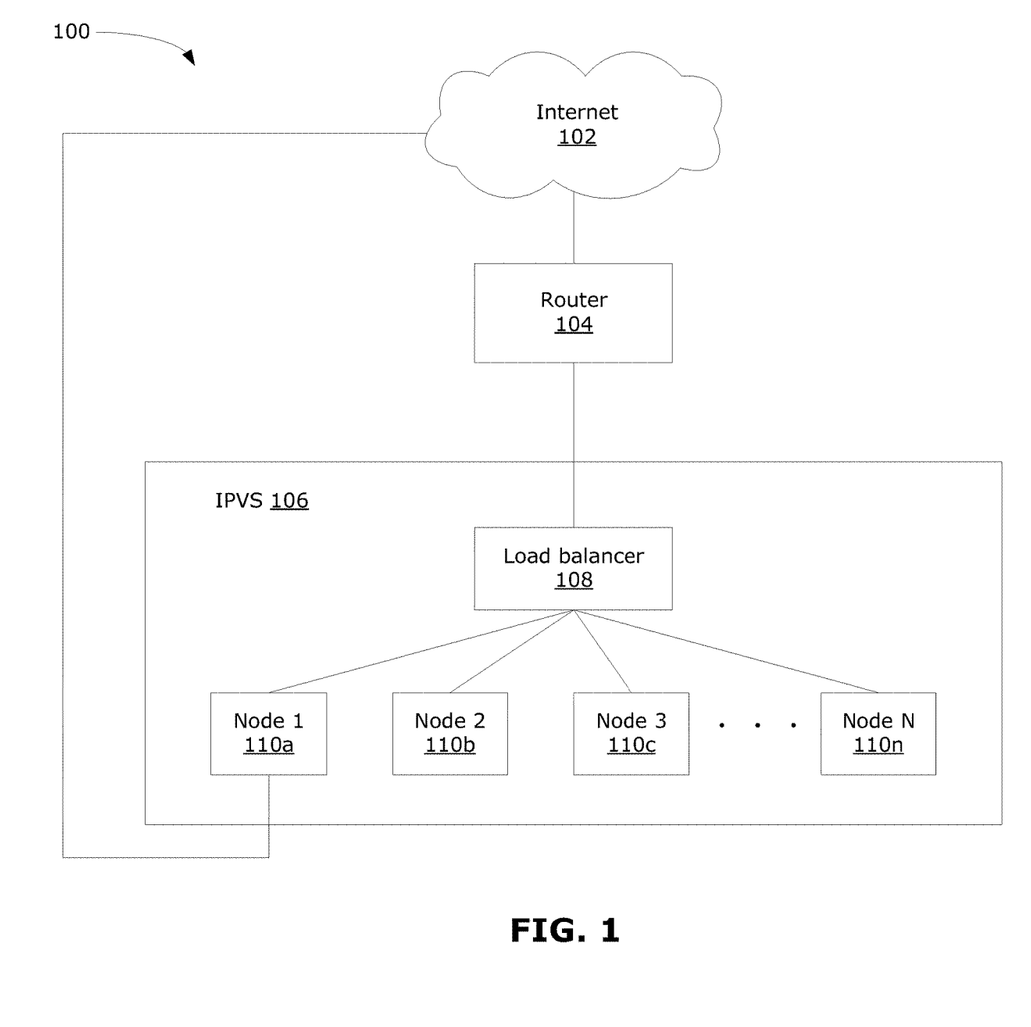
FIG. 1 is a schematic diagram of an example system including an IPVS.

FIG. 1 is a schematic diagram of an example system 100 including an internet protocol virtual server (IPVS) 106. In the system 100, a client (not shown) may send a transmission control protocol (TCP) packet over the internet 102. The destination internet protocol (IP) of the TCP packet is the virtual IP of the IPVS 106. The TCP packet may be received by a router 104, which directs the packet to the IPVS 106, in accordance with the destination IP of the TCP packet. In FIG. 1, the IPVS 106 is implemented by a load balancer 108, which manages connections to a group of real request handling servers, also referred to as servers, end nodes or more generally nodes 110a to 110n (collectively nodes 110).

Figure 2:
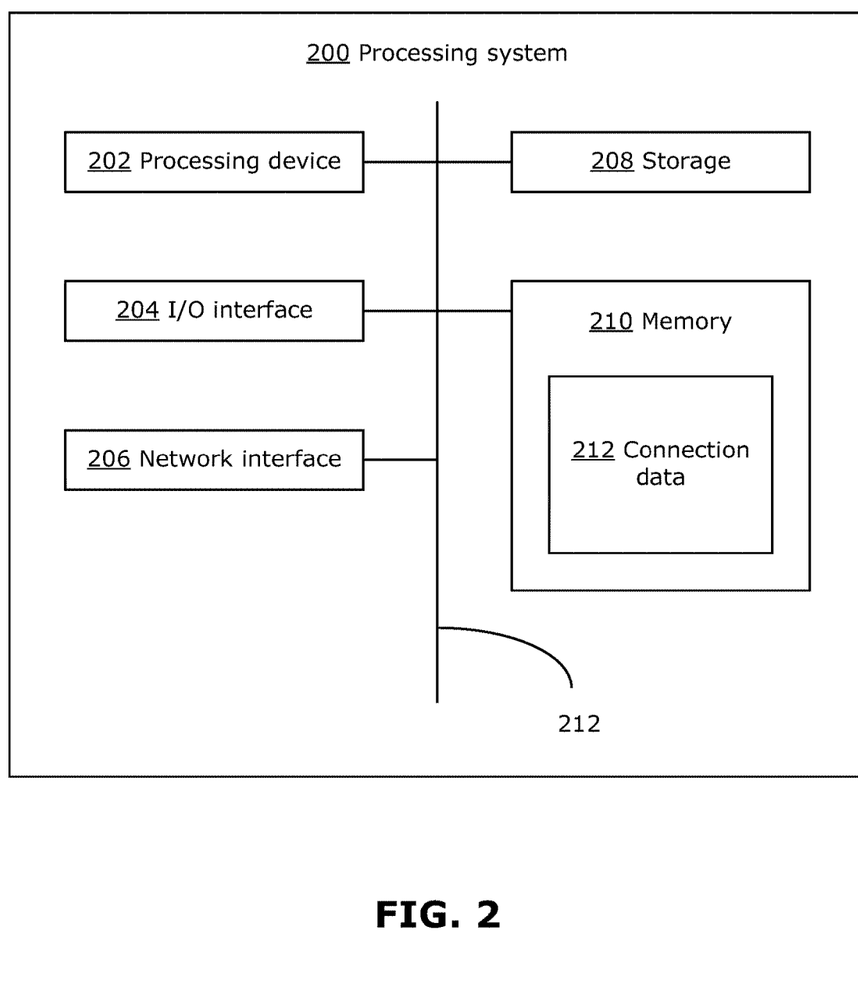
FIG. 2 is a schematic diagram of an example computing system that may be used to implement an IPVS.

FIG. 2 is a block diagram illustrating an example computing system 200, which may be used to implement the methods and systems disclosed herein, for example the load balancer 108. Other computing systems suitable for implementing the present disclosure may be used, which may include components different from those discussed below. Although FIG. 2 shows a single instance of each component, there may be multiple instances of each component in the computing system 200.

The computing system 200 includes one or more processing devices 202, such as a processor, a microprocessor, an application-specific integrated circuit (ASIC), a field-programmable gate array (FPGA), a dedicated logic circuitry, or combinations thereof. The computing system 200 may also include one or more input/output (I/O) interfaces 204, which may enable interfacing with one or more appropriate input devices and/or output devices (not shown). The computing system 200 includes one or more network interfaces 206 for wired or wireless communication with a network (e.g., an intranet, the internet 102, a P2P network, a WAN, a LAN, and/or a Radio Access Network (RAN)). The network interface(s) 206 may include wired links (e.g., Ethernet cable) and/or wireless links for intra-network and/or inter-network communications. The computing system 200 may also include one or more storage units 208, which may include a mass storage unit such as a solid state drive, a hard disk drive, a magnetic disk drive and/or an optical disk drive.

The computing system 200 may include one or more memories 210 (though there may commonly be only one memory 210), which may include a volatile or non-volatile memory (e.g., a flash memory, a random access memory (RAM), and/or a read-only memory (ROM)). The non-transitory memory(ies) 210 may store instructions (e.g., in the form of software modules) for execution by the processing device(s) 202, such as to carry out the methods described in the present disclosure. For example, the memory(ies) 210 may store connection data 212 about the connection(s) to the nodes 110. The memory(ies) 210 may include other software instructions, such as for implementing an operating system and other applications/functions. In some examples, one or more data sets and/or module(s) may be provided by an external memory (e.g., an external drive in wired or wireless communication with the computing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 214 providing communication among components of the computing system 200, including the processing device(s) 202, I/O interface(s) 204, network interface(s) 206, storage unit(s) 208 and/or memory(ies) 210. The bus 214 may be any suitable bus architecture including, for example, a memory bus, a peripheral bus or a video bus.

Reference is made again to FIG. 1 to describe the operation of the IPVS 106. All incoming packets to the IPVS 106 arrive at the load balancer 108, which is configured to implement address resolution protocol (ARP). The load balancer 108 determines whether the incoming packet is for an existing connection, for example by checking the connection data 212 (which may be stored in the form of a hash table) in the memory 210 of the load balancer 108. The load balancer 108 may check whether the incoming packet matches an existing entry in the connection data 212 (e.g., by checking whether the source IP and source port of the packet matches a connection entry in the connection data 212). If a match is found this indicates that the packet is for an existing connection. The load balancer 108 identifies the appropriate node 110 for the connection (e.g., using mapping information stored in the connection data 212) and inserts the address of the identified node 110 in the destination MAC address of the packet.

If the incoming packet does not match an existing entry in the connection data 212, this indicates that a new connection to a node 110 is required for the incoming packet. The load balancer 108 selects a node 110 for the new connection (e.g., using a suitable scheduling algorithm). After the connection is established, data about the established connection (e.g., source IP, source port and address of destination node 110) is added to as an entry in the connection data 212. The selected node 110 and the client may then carry out suitable operations, such as a TCP handshake, over the connection.

It should be noted that the node 110 participating in an active connection may store data associated with the connection (e.g. sequence number, encryption key, or TCP connection-specific information) locally at the node 110 and/or in another database (as described in further detail below), in addition to the connection data 212 stored in the load balancer 108.

Outgoing packets from the nodes 110 do not need to be sent via the load balancer 108. Each node 110 may transmit outgoing packets, bypassing the load balancer 108, to the target client via the internet 102, for example. FIG. 1 illustrates a communication link between node 1 110*a* and the internet 102 for transmitting outgoing packets. Similar communication links may be present between each node 110, however only the communication link for outgoing packets from node 1 110*a* has been shown for simplicity.

Generally, the client is not aware of the individual nodes 110 of the IPVS 106, and does not know which specific node 110 of the IPVS 106 the client is communicating with.

Conventional load balancing mechanisms typically have difficulties in handling persistent TCP connections and also in dynamically scaling up or down the number of servers in the IPVS group of servers. Client applications, such as HTTP/2 and websocket, as well as web-facing large-scale applications, often need to keep connections open over a long time duration. Persistent database connections may also require long running connections. Some prior approaches use reverse proxies, but these still require all TCP diagrams from a particular connection to be sent to the same request handling server, because only that particular server has the TCP connection open. Examples described herein may help to address such challenges.

Figure 3:
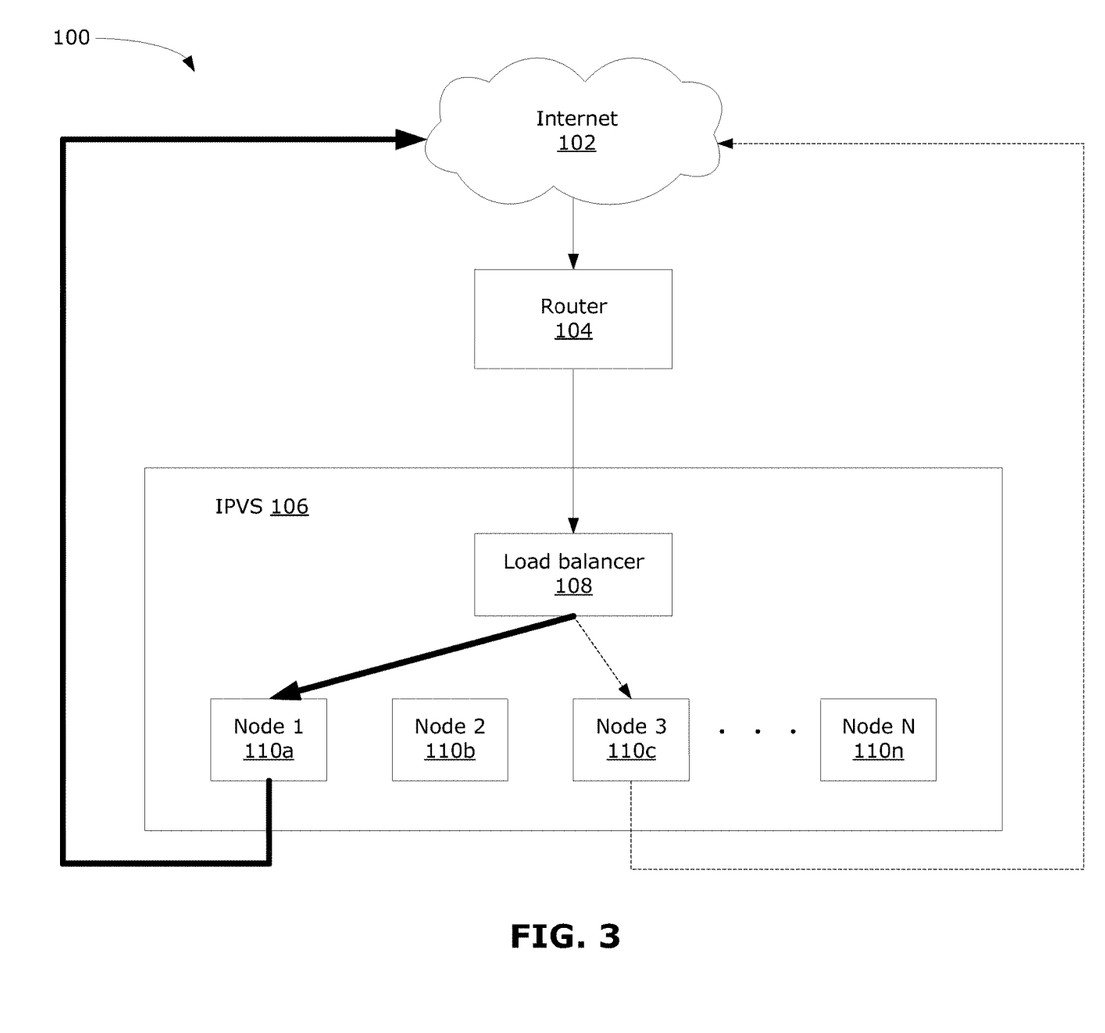
FIG. 3 illustrates an example of managing connections in an IPVS.

FIG. 3 illustrates an example of how an active connection, which may be a persistent connection, may be managed.

As described above, packets from a client is communicated via the internet 102 and router 104, arriving at the load balancer 108. Data is communicated with the client over an active connection (dotted lines) established with a particular node 110 of the IPVS 106, in this case node 3 110*c*. It may be necessary to re-route the connection to one or more other nodes 110, for example if node 3 110*c* needs to be taken offline (e.g., for rebooting, maintenance or upgrade) or if node 3 110*c* is overloaded (e.g., handling too many connections or too much data is arriving at node 3 110*c*). In some examples, node 3 110*c* may be taken offline for the purpose of power conservation (e.g., when there is low traffic to the IPVS 106 and fewer nodes 110 are required to handle the traffic).

Prior to being taken offline, node 3 110*c* determines information (e.g., information about the TCP handshake) about its currently active connection, this information about the current state of the connection being referred to herein as checkpoint data. The checkpoint data about the connection may be transmitted to the load balancer 108, to be stored in association with the connection in the connection data 212 of the load balancer 108. In some examples, some of the checkpoint data (e.g., encryption keys for secure sockets layer (SSL) connections) may be transmitted to another database, instead of the load balancer 108, for storage. Node 3 110*c* may then be taken offline. The load balancer 108 may store an indicator (e.g., a flag or status value) indicating that node 3 110*c* is offline or otherwise unavailable.

The process of determining and storing information about a current state of a connection may be referred to as "checkpointing" the connection. Generally, checkpointing may be performed to obtain sufficient information about an active connection to enable the connection to be fully restored. The checkpoint data that is obtained for a connection may provide sufficient information for the connection to be restored with little or no impact on the client experience. For example, checkpoint data may include the sequence number of the last packet transmitted over the connection, and the sequence number may be used, as discussed further below, to ensure that packets are not lost or duplicated when the connection is re-routed.

When the client sends a new packet to the IPVS 106 over the connection that was previously established at node 3 110*c*, the load balancer 108 determines that the destination server is node 3 110*c* (e.g., using the connection data 212) and that node 3 110*c* is offline or unavailable (e.g., using the previously stored status indicator). The load balancer 108 then uses an appropriate scheduling algorithm to determine a new node 110 to which the connection should be re-routed. In this example, the connection is re-routed to node 1 110*a*. The thick black lines in FIG. 3 indicate the re-routed connection to node 1 110*a*.

The load balancer 108 may then update the entry in the connection data 212 to indicate the address of node 1 110*a* as the destination address of the connection. In some examples, the load balancer 108 may determine the new node 110 and update the connection data 212 prior to receiving a new packet for the re-routed connection.

The connection may be restored at node 1 110*a* (e.g., using a suitable TCP connection restoration mechanism). Restoring the connection may include the load balancer 108 transmitting some or all the checkpoint data of the connection to node 1 110*a*. In cases where only a portion of the checkpoint data is stored by the load balancer 108, for example if some checkpoint data was stored by node 3 110*c* on another database, node 1 110*a* may retrieve the remaining portion of checkpoint data (e.g., TCP connection data and SSL handshake information) from the other database. The load balancer 108 may provide node 1 110*a* with information (e.g., a lookup key) to retrieve the remaining portion of checkpoint data from the other database.

The checkpoint data provides node 1 110*a* sufficient information to resume the connection, for example node 1 110*a* may use a connection repair mechanism using the checkpoint data to resume the connection. Because the checkpoint data contains sufficient information about the state of the connection prior to re-routing, the connection may be resumed at node 1 110*a* with little or no impact to the client. In this way, re-routing of an active connection may be transparent to the client.

The above description is for re-routing of a single connection. The above example also applies for re-routing of multiple connections, for example in the case where there are multiple active connections at node 3 110*c* when node 3 110*c* is to be taken offline. Node 3 110*c* determines and transmits checkpoint data for each active connection, and the load balancer 108 re-routes each connection as described above. The load balancer 108 may re-route the connections to any one or more nodes 110 of the IPVS 106, for example using a suitable scheduling algorithm. The connections may all be re-routed to the same new destination node (e.g., node 1 110*a*) or may be re-routed to different nodes 110 of the IPVS 106.

It should be understood that the above-described checkpointing and re-routing of connections may also be performed when node 3 110*c* remains online, such as when only a portion of the active connections at node 3 110*c* is re-routed. For example, the load balancer 108 may perform load rebalancing (e.g., at present intervals of time or in response to a change in traffic volume) and determine that one or more active connections at node 3 110*c* should be re-routed, and that at least one other active connection should remain at node 3 110*c*. In some examples, re-routing of a connection may be performed in order to reclaim resources (e.g., memory space and TCP socket) used by the connection. For example, the load balancer 108 may identify that an active connection is a candidate for re-routing when the connection has been idle for longer than a preset time duration threshold. The connection may be disconnected from node 3 110c to free up the resources at node 3 110c. The load balancer 108 may notify node 3 110c when the checkpoint data for the affected connection(s) has been stored, enabling node 3 110c to release the resources that were formerly reserved for the affected connection(s).

Node 3 110c may determine and transmit checkpoint data for only the connection(s) affected by the load rebalancing, similar to that described above for a single connection. The load balancer 108 may use an appropriate scheduling algorithm to rebalance only those affected connection(s), and those affected connection(s) may then be restored at new destination node(s) 110. In some cases, the connection may be re-routed back to the same node 110 (e.g., back to node 3 110c), for example if the node 110 remains online or is back online, or if resources become available on the node 110, when the new client packet arrives.

The connection management operations described above may also be used to manage active connections when scaling up the number of nodes 110 of the IPVS 106 (e.g., to re-route active connections to the new nodes 110) or when scaling down the number of nodes 110 of the IPVS 106 (e.g., to re-route active connections away from nodes 110 that are being removed).

Figure 4:
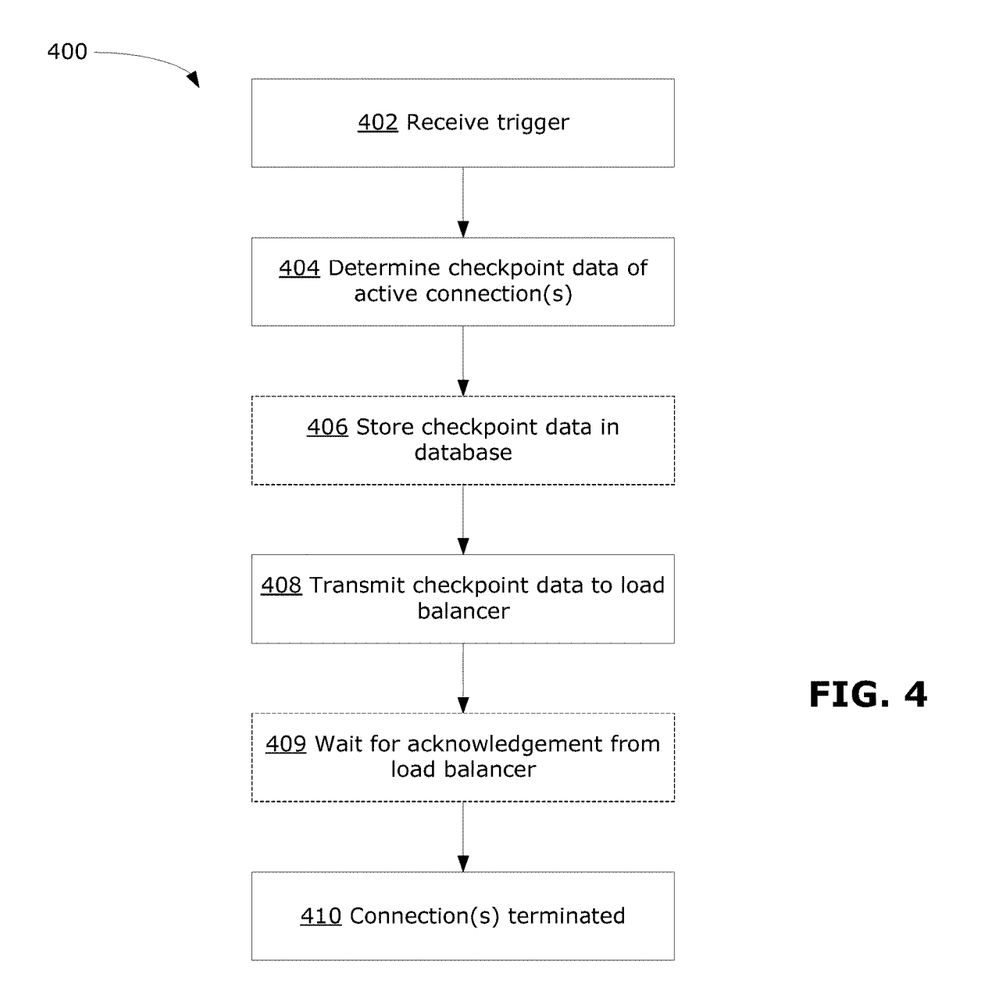
FIG. 4 is a flowchart illustrating an example method for managing connections at a node of an IPVS.

FIG. 4 is a flowchart illustrating an example method 400, that may be performed at a node 110, to enable managing of connections (e.g., load-rebalancing or re-routing existing connections) at the load balancer 108. For example, the method 400 may be performed by node 3 110c (e.g., as described above with reference to FIG. 3), prior to node 3 110c being taken offline.

At 402, the node 110 receives a trigger to initiate checkpointing of one or more active connections at the node 110. The trigger may be, for example, a message from the load balancer 108 indicating that one or more active connections at the node 110 are to be re-routed, or more generally indicating that load rebalancing is to be performed. The trigger may also be, for example, instructions, from the load balancer 108, from another network entity, or received as input to the node 110 itself, to go offline or restart. The trigger may also be generated internally by the node 110 itself, for example at regular preset intervals (e.g., to backup its active connections).

In some examples, the trigger may also provide indication of which connection(s) at the node 110 are affected. For example, the load balancer 108 may transmit a message to indicate to the node 110 which connection(s) are to be re-routed.

In some examples, where data communication is currently taking place over a connection that is to be checkpointed, the node 110 may pause data communication over the connection. Alternatively, the node 110 may delay checkpointing of the connection until there is a break in the data communication.

At 404, in response to the trigger, the node 110 determines checkpoint data of one or more active connections at the node 110. The checkpoint data includes information for restoring the connection(s), and may include information representing a current state of the connection(s). The checkpoint data may include connection-specific data stored locally at the node 110, for example encryption keys, sequence numbers or handshake data. In some examples, such as where the trigger provides indication of which connection(s) at the node 110 are affected, the node 110 may determine checkpoint data for those particular connection(s).

Determining checkpoint data may include the node 110 querying a kernel of the node 110, for example, to extract information (e.g., handshake data) that should be checkpointed.

Optionally, at 406, some or all of the checkpoint data may be stored on a database, such as a database local to the IPVS or an external database. This may be appropriate where some checkpoint data, such as encryption keys, are unsuitable to be stored as an entry in the connection data 212 stored by the load balancer 108. If any checkpoint data is stored on a database, the checkpoint data may be stored in association with identifying information identifying the particular connection to which particular checkpoint data applies. This may enable the appropriate checkpoint data to be retrieved by another node 110 (e.g., node 1 110a in the example of FIG. 3) when the connection is resumed.

At 408, the node 110 transmits some or all of the checkpoint data to the load balancer 108. Where a portion of the checkpoint data has been stored on a database at 406, the remaining portion of the checkpoint data may be transmitted to the load balancer 108. The load balancer 108 may store the received checkpoint data in association with the respective connection(s) in the connection data 212.

At 410, the node 110 terminates the connection(s) that have been checkpointed. In some examples, the node 110 may, at 409, optionally wait for acknowledgement from the load balancer 108 that the checkpoint data for the connection(s) have been stored, before terminating the connection(s). Termination of a connection by the node 110 may include closing the connection, and freeing the relevant resources and data required to hold that connection.

Figure 5:
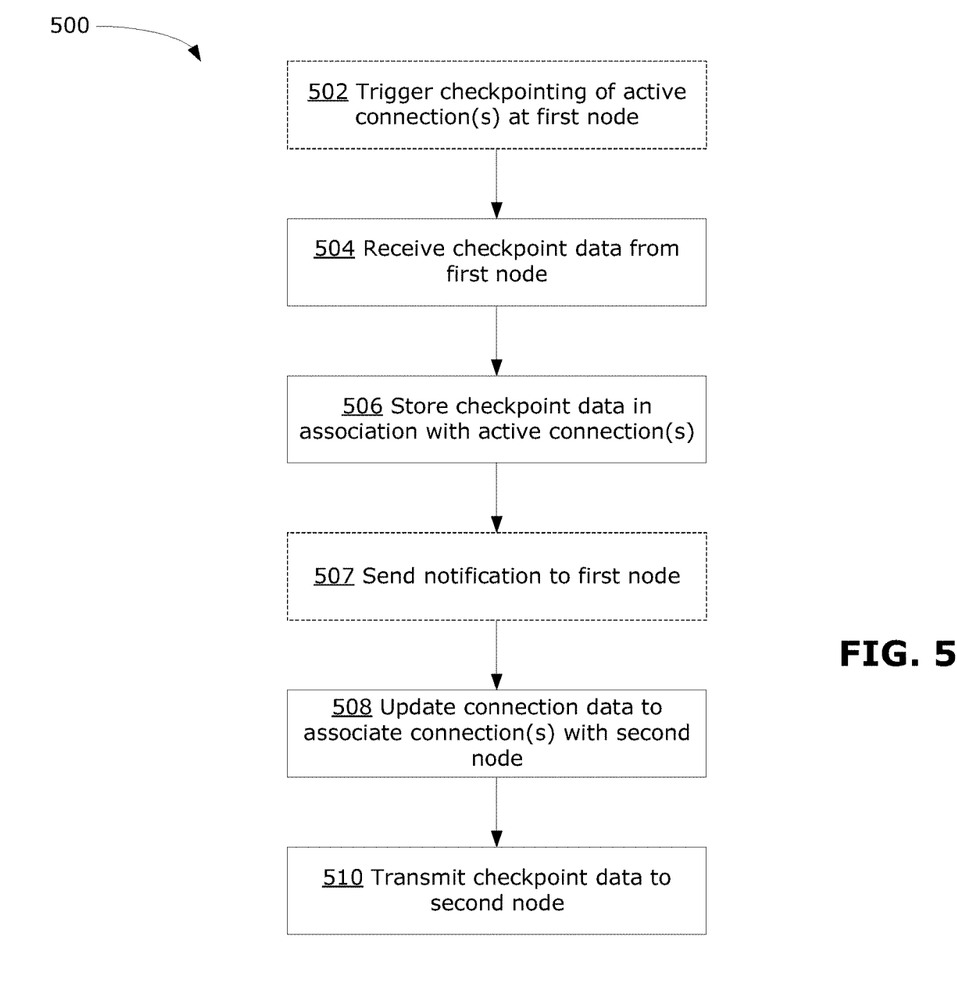
FIG. 5 is a flowchart illustrating an example method for managing connections at a load balancer of an IPVS.

FIG. 5 is a flowchart illustrating an example method 500, that may be performed at the load balancer 108, to enable managing of connections (e.g., load-rebalancing or re-routing existing connections). For example, the method 500 may be performed to re-route connections from node 3 110c to node 1 110a (e.g., as described above with reference to FIG. 3).

Optionally, at 502, the load balancer 108 may trigger checkpointing of one or more active connections at a first node 110. For example, the load balancer 108 may trigger checkpointing of a connection when the load balancer 108 detects that the connection has been idle for long than a preset time duration threshold. The load balancer 108 may also trigger checkpointing of connections in response to a change in incoming traffic, or if the load balancer 108 detects that one or more nodes 110 is overloaded.

In some examples, the load balancer 108 does not trigger the checkpointing of connection(s) at the first node 110. Checkpointing of the connection(s) may instead be triggered elsewhere, for example due to a server reset initiated locally at the first node 110. The load balancer 108 may or may not be informed of such external triggers.

At 504, the load balancer 108 receives checkpoint data from the first node 110 about one or more active connection(s) at the first node 110. In some examples, the checkpoint data received by the load balancer 108 may be only a portion of the checkpoint data for a connection (e.g., checkpoint data such as encryption keys may be stored elsewhere).

At 506, the load balancer 108 stores the checkpoint data received from the first node 110 in associated with the respective connection(s). This checkpoint data may be stored as an entry in the connection data 212, associated with data about the respective connection(s). Where a portion of the checkpoint data is stored on another database, the checkpoint data stored by the load balancer 108 may include information (e.g., a lookup key) to enable the correct checkpoint data to be retrieved from the other database.

In examples where the first node 110 remains online (e.g., only a subset of the first node's 110 connections is being re-routed), the load balancer 108 may, at 507, optionally notify the first node 110 when the checkpoint data for the respective connection(s) has been stored (e.g., by sending an acknowledgement or other notification message). When the first node 110 receives this notification, the first node 110 may release the resources that were formerly used for the respective connection(s).

At 508, the load balancer 108 updates the connection data 212 with information identifying new destination node(s), for example at least one second node 110, to re-route the connection(s) to the new destination node(s). This updating may be performed for each connection when a new client packet arrives for that connection, or may be performed prior to receipt of a new client packet for that connection. For example, the load balancer 108 may update the connection data 212 after storing the checkpoint data, and may notify the first node 110 accordingly, prior to receipt of a new client packet, in order to enable the first node 110 to release the connection resources. In some examples, the load balancer 108 may perform load balancing operations (e.g., using an appropriate IPVS scheduling algorithm) in order to determine to which node(s) the connection(s) should be re-routed. Where there are multiple connections to be re-routed, the connections may be re-routed to a plurality of nodes 110.

At 510, the checkpoint data for the re-routed connection(s) is transmitted to the destination node(s) 110. This checkpoint data may be transmitted as to enable TCP connection restoration operations at the destination node(s) 110. The checkpoint data may be transmitted for each connection when each connection is restored as new client packets arrive for each respective connection. In some examples, the checkpoint data transmitted by the load balancer 108 may only be a portion of the checkpoint data required to restore the connection (e.g., where the checkpoint data received from the first node 110 is incomplete for restoring the connection). In such cases, when the new destination node 110 receives the checkpoint data from the load balancer 108, the new destination node 110 may retrieve the remaining portion of checkpoint data from another database. For example, the checkpoint data may include information (e.g., a lookup key) for the new destination node 110 to retrieve the remaining portion of the checkpoint data from the other database.

The new destination node 110 may then restore the connection using the checkpoint data, as described above. Incoming client packets for the connection may thus be forwarded to the new destination node 110.

The present disclosure describes methods and systems for managing connections, including long-running persistent TCP connections, in an IPVS environment. Examples described herein may enable active connections to be maintained even when a node of an IPVS is to be taken offline. Examples described herein may enable dynamic load rebalancing in an IPVS, while maintaining all active connections, with little or no impact to the client experience. Examples described herein may also enable TCP connections to be shut down and restarted, with little or no impact to the client experience. The described methods and systems provide flexibility for re-routing connections to different nodes within the IPVS, for example for load rebalancing, and for up-scaling or down-scaling the number of nodes to adapt to changes in traffic and changes in the amount of work to be performed by the nodes of the IPVS.

Further, the flexibility to re-route connections may enable the ability to gain or lower privileges for an active connection, or to increase or decrease security for a connection, by moving the connection to different nodes with different security or privileges setup. The status of a connection may thus be dynamically changed even as the connection remains active. As well, the example methods and systems described herein may enable server maintenance and upgrades (e.g., software upgrades) to be performed without requiring the connections at that server to be disconnected.

Examples described herein may be useful for applications and systems requiring long running connections, such as HTTP/2 and websocket applications, web-facing large-scale applications, as well as applications requiring persistent database connections.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method, at an end node of the IPVS, for managing a connection in an internet protocol virtual server (IPVS), the method comprising:
receiving a trigger to initiate checkpointing of an active connection at the end node of the IPVS;

transmitting, by the end node, at least a portion of checkpoint data to a load balancer of the IPVS, the checkpoint data including information for restoring the active connection and for representing a current state of the active connection, the information including connection-specific data stored locally at the end node, the connection-specific data including at least one of an encryption key, a sequence number, handshake information or transmission control protocol (TCP) connection information; and terminating the active connection.

2. The method of claim 1, wherein a remaining portion of the checkpoint data is transmitted to another database for storage.

3. The method of claim 1, wherein the trigger is an indicator that the end node is to be taken offline, and the trigger initiates checkpointing of all active connections at the end node.

4. The method of claim 1, wherein the trigger includes information identifying one or more active connections at the end node to be checkpointed.

5. The method of claim 1, wherein receiving the trigger comprises the end node generating the trigger.

6. The method of claim 1, wherein terminating the active connection is in response to receipt of a notification from the load balancer indicating that at least the portion of checkpoint data has been stored.

7. A method for managing a connection in an internet protocol virtual server (IPVS), the method comprising:
receiving at least a portion of checkpoint data from a first end node of the IPVS, the checkpoint data including information for restoring a connection of the first end node and information representing a current state of the connection;
transmitting at least the portion of checkpoint data to a second end node of the IPVS;
storing at least the portion of checkpoint data in association with connection data for the connection;
updating the connection data with information about the second end node; and
forwarding an incoming data packet for the connection to the second end node, in accordance with updated connection data, by:
identifying, using the checkpoint data, the second end node as a new destination node for the incoming packet; and
updating the incoming data packet by inserting an address of the second end node as a new destination address of the incoming data packet.

8. The method of claim 7, wherein updating the connection data is performed after receiving the incoming data packet for the connection.

9. The method of claim 7, wherein updating the connection data is performed prior to receiving the incoming data packet for the connection.

10. The method of claim 7, wherein the connection data is stored as a hash table.

11. The method of claim 7, wherein receipt of the portion of checkpoint data at the second end node causes the second end node to retrieve a remaining portion of checkpoint data from another database.

12. The method of claim 7, further comprising triggering checkpointing of the connection at the first end node.

13. The method of claim 7, further comprising transmitting a notification to the first end node indicating that at least the portion of checkpoint data has been stored.

14. An end node of an internet protocol virtual server (IPVS), the end node comprising a processing device configured to cause the end node to:
receive a trigger to initiate checkpointing of an active connection of the end node;
transmit at least a portion of checkpoint data to a load balancer of the IPVS, the checkpoint data including information for restoring the active connection and for representing a current state of the active connection, the information including connection-specific data stored locally at the end node, the connection-specific data including at least one of an encryption key, a sequence number, handshake information or transmission control protocol (TCP) connection information; and
terminate the active connection.

15. The end node of claim 14, wherein a remaining portion of the checkpoint data is transmitted to another database for storage.

16. The end node of claim 14, wherein the processing device is configured to cause the end node to terminate the active connection in response to receipt of a notification from the load balancer indicating that at least the portion of checkpoint data has been stored.

17. A load balancer of an internet protocol virtual server (IPVS), the load balancer comprising a processing device configured to cause the load balancer to:
receive at least a portion of checkpoint data from a first end node of the IPVS, the checkpoint data including information for restoring a connection of the first end node and information representing a current state of the connection;
transmit at least the portion of checkpoint data to a second end node of the IPVS;
store, in a memory of the load balancer, at least the portion of checkpoint data in association with connection data for the connection;
update the connection data with information about the second end node; and
forward an incoming data packet for the connection to the second end node, in accordance with updated connection data, by:
identifying, using the checkpoint data, the second end node as a new destination node for the incoming packet; and
updating the incoming data packet by inserting an address of the second end node as a new destination address of the incoming data packet.

18. The load balancer of claim 17, wherein the processing device is further configured to cause the load balancer to trigger checkpointing of the connection at the first end node.

* * * * *